(12) United States Patent
LaCroix

(10) Patent No.: US 11,328,310 B2
(45) Date of Patent: May 10, 2022

(54) IN-LINE SURVEY SYSTEM AND METHODOLOGY

(71) Applicant: Jeffrey Allyn LaCroix, Irving, TX (US)

(72) Inventor: Jeffrey Allyn LaCroix, Irving, TX (US)

(*) Notice: Subject to any disclaimer, the term of this patent is extended or adjusted under 35 U.S.C. 154(b) by 0 days.

(21) Appl. No.: 16/940,057

(22) Filed: Jul. 27, 2020

(65) Prior Publication Data

US 2021/0035131 A1 Feb. 4, 2021

Related U.S. Application Data

(60) Provisional application No. 62/882,293, filed on Aug. 2, 2019.

(51) Int. Cl.
| | |
|---|---|
| G06Q 30/02 | (2012.01) |
| G06F 16/958 | (2019.01) |
| H04M 3/51 | (2006.01) |
| H04M 3/493 | (2006.01) |
| G10L 15/26 | (2006.01) |
| G10L 15/22 | (2006.01) |
| G10L 15/30 | (2013.01) |
| H04L 65/10 | (2022.01) |
| H04L 67/10 | (2022.01) |

(52) U.S. Cl.
CPC ....... *G06Q 30/0203* (2013.01); *G06F 16/986* (2019.01); *G10L 15/22* (2013.01); *G10L 15/26* (2013.01); *G10L 15/30* (2013.01); *H04M 3/493* (2013.01); *H04M 3/5166* (2013.01); *G10L 2015/223* (2013.01); *H04L 65/1006* (2013.01); *H04L 67/10* (2013.01)

(58) Field of Classification Search
CPC .......................... H04M 3/493; H04M 3/5166; G06Q 30/0203; G06F 16/986
See application file for complete search history.

(56) References Cited

U.S. PATENT DOCUMENTS

| | | | |
|---|---|---|---|
| 2004/0172323 A1* | 9/2004 | Stamm | G06Q 30/02 705/7.32 |
| 2007/0064884 A1* | 3/2007 | Corcoran | H04M 3/4938 379/88.01 |
| 2011/0182283 A1* | 7/2011 | Van Buren | H04M 7/0075 370/352 |

* cited by examiner

*Primary Examiner* — Rasha S Al Aubaidi
(74) *Attorney, Agent, or Firm* — Crump Law P.C.

(57) ABSTRACT

A cloud based in-line survey system that works in conjunction with conventional interactive voice response systems. The survey system employs hardware and software that are stored and/or facilitated apart from that of the host interactive voice response system ("IVR"). The survey system uses a cloud based data collection model, the "survey data model." The functionality of the survey data model is hosted and/or accessible through an on-line user interface or viewer, which provides the functionality of the survey model to the enterprise users and survey participants. The survey system can be accessed indirectly by the enterprise IVR transferring the participant to a survey model at the end of a service call, or by requesting the participant to call in directly to the survey system.

4 Claims, 6 Drawing Sheets

IN-LINE SURVEY SYSTEM AND METHODOLOGY

This application claims the benefit of U.S. Provisional Application No. 62/882,293 filed Aug. 2, 2019, the disclosure of which is hereby incorporated by reference.

This invention relates to interactive voice response systems, and in particular, an in-line survey sub-system for interactive voice response systems.

BACKGROUND OF THE INVENTION

Businesses have automated call centers for addressing a variety of customer service activities. Call centers often employ interactive voice response systems ("IVR") as part of an integrated information system. Businesses often have an additional need to collect survey information for call center users. Recently, "in-line" phone survey systems have become popular. The term "in-line" refers to the offering of a survey during a customer call into a business's call center for service. FIG. 1 illustrates a typical in-line survey system. As shown in FIG. 1, conventional in-line survey systems rely on customer/survey participants 2 calling into an enterprise call center 20 using conventional telephonic networks, i.e. the telephone 10 and using the enterprise's on-site or integrated switching equipment 22, IVR 24 and survey programs 26 to collect and retain survey response data in an enterprise database 28. In-line survey systems enjoy a high rate of success in collecting customer satisfaction numbers and data concerning customer experience because they are offered to a "captive" audience already on the phone and do not require the customer to independently browse to a web site, make a separate call, or answer an email.

Survey information collected via either company owned IVR or telephone servers via a "bridge" have been developed and patented by Genesys and Teknekron; however, these systems are costly and require significant capital expenditures for on-site proprietary survey equipment. Two requirements of in-line survey systems are stealthiness and the ability to record the customer experience prior to the survey. Stealthiness refers to an agent's ability to detect that a survey is being offered after a particular call. The survey should not be detectable via phone display, call delay, or audible clicks or beeps. Recording of the customer experience before the survey allows managers to hear the experience being evaluated by the survey.

The advent of Session Initiation Protocol ("SIP") telephony and voice extensible markup language ("Voice XML") has opened up possibilities not yet understood by many telephony professionals absorbed in past, legacy methods of performing tasks via phone. XML was created to allow standard desktop browsers to exchange and manipulate data. Voice XML is an Internet engineering task force ("IETF") standard which allows a telephone to be used as a browser, performing web site perusal via voice commands in much the way visual browsers navigate web sites via "mouse" clicks.

SIP telephony puts call control on the same pipe as the internet using transmission control protocol ("TCP") and HyperText Transfer Protocol ("HTTP"), antiquates basic legacy computer telephony integration ("CTI"), and basic phone event notification with its "English-like" protocol structures. SIP also enables many new types of telephone applications as telephone calls rub shoulders with internet traffic. Such applications are enabled by such SIP defined entities as application servers and boarder controllers.

SUMMARY OF THE INVENTION

The survey system of this invention is a cloud based in-line sub-system that works in conjunction with conventional interactive voice response systems. The survey system employs hardware and software that are stored and/or facilitated apart from that of the host IVR. The survey system uses a cloud based data collection model, the "survey data model." The functionality of the survey data model is hosted and/or accessible through an on-line user interface or viewer, which provides the functionality of the survey model to the enterprise users and survey participants. The survey system can be accessed indirectly by the enterprise IVR transferring the participant to survey model at the end of a service call, or by requesting the participant to call in directly to the survey system. The survey viewer incorporates various system modules, components and devices, including: a phone browser, speech-to-text devices, recording devices, website access devices, and various web pages, collectively the survey website.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
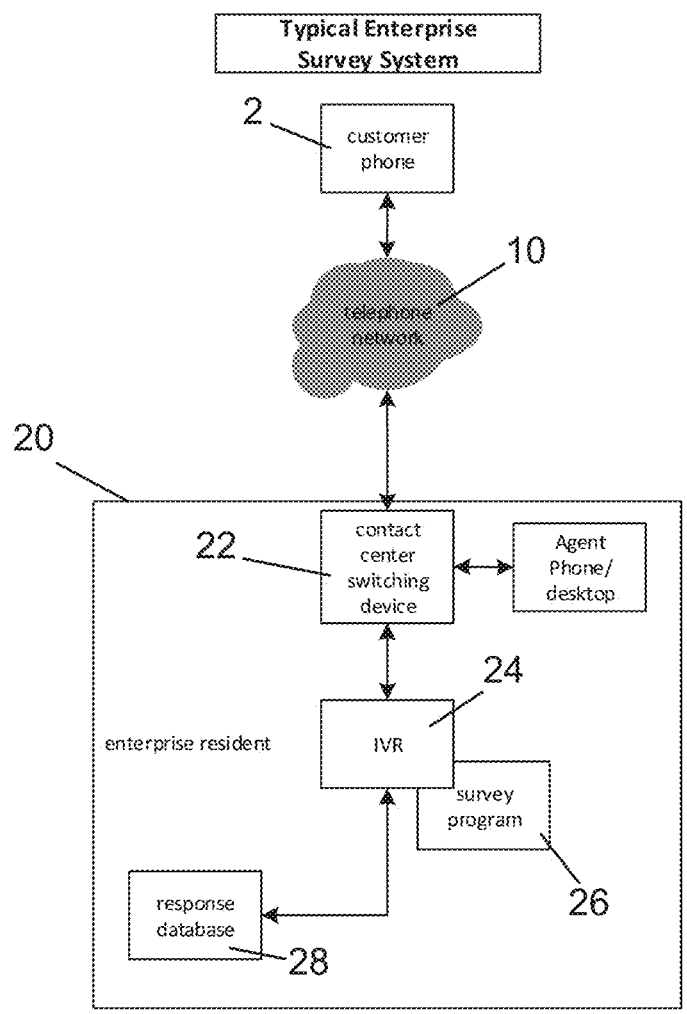
FIG. 1 is a simplified schematic of a prior art enterprise survey system
Figure 2:
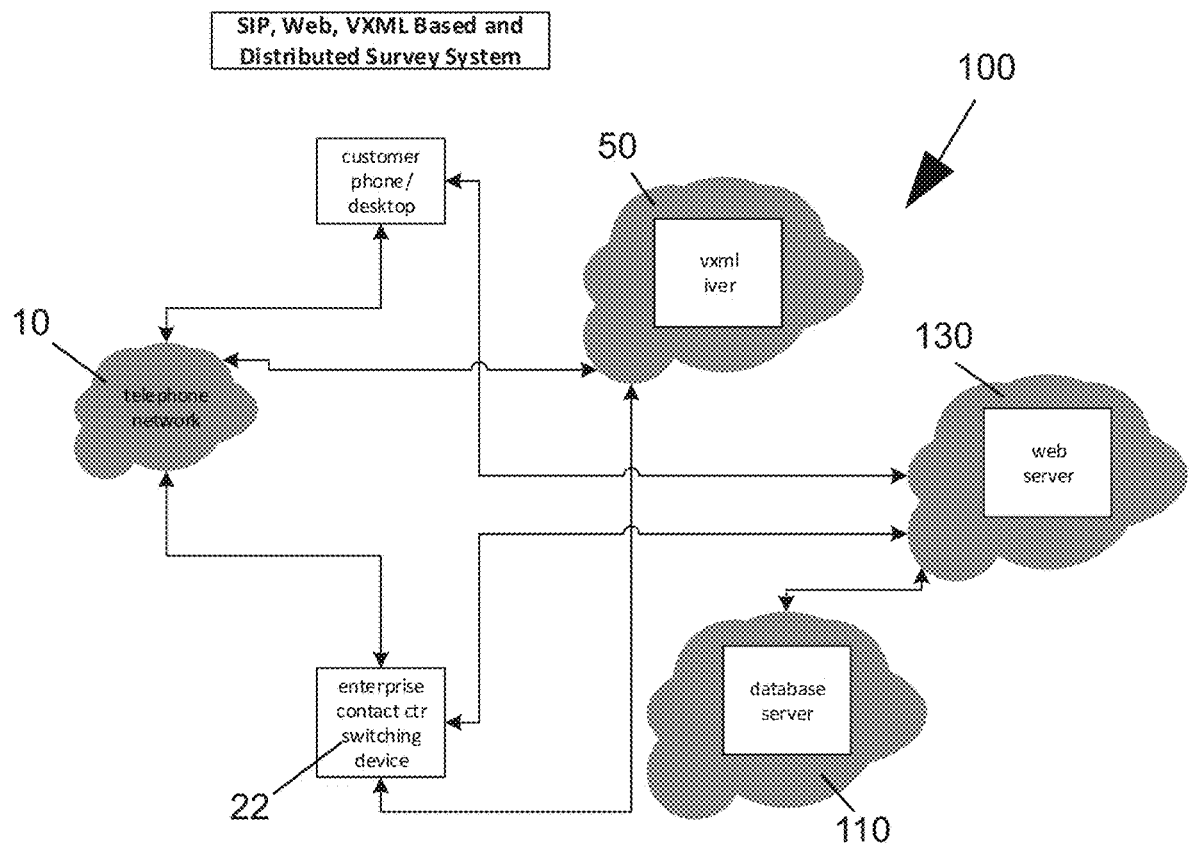
FIG. 2 is a simplified schematic of an exemplary embodiment of the enterprise survey system of this invention.

Referring now to the drawings, FIG. 2 illustrates a simplified schematic of an exemplary embodiment of the cloud based survey in-line sub-system of this invention, which is designated generally as reference numeral 100. Survey system 100 is an on-line subsystem of an interactive voice response system ("IVR") 50 used and/or hosted by various customers, i.e. businesses. Survey system 100 is a "distributed system" meaning that the hardware and software are stored and/or facilitated apart from that of the host IVR 50. Survey system 100 and IVR 50 are implemented using a variety of application software running on a variety of system hardware, including but not limited to mainframes, PCs, terminals, network servers, communication equipment, data storage and backup equipment, databases, data compilers, and user interfaces, all of which are well known and understood in the arts, but not depicted in the figures. Survey Systems 100 also is designed for used with conventional telephone systems and equipment 10 utilized separately by both the survey enterprise and the survey participants Survey system 100 is based on an on-line, cloud based data collection model—the "survey data model" 110. Survey data model 110 is facilitated and manifested using off-sight, on-line business hardware and logic devices 112 and database structures and devices 114, which store, structure, organize and report the survey information. The functionality of survey data model 110 is hosted and/or accessible through an on-line viewer 120, which provides the functionality of the survey model to the enterprise users and survey participants. Survey system 100 can be accessed indirectly by the enterprise IVR transferring the participant to survey model at the end of a service call, or by requesting the participant to call in directly to the survey system.

Survey model 110 is accessed via user interface ("viewer") 120. Survey viewer 120 incorporates various system modules, components and devices, including: a phone browser 122, speech-to-text devices 124, recording devices 126, website access devices 128, and various web pages, collectively the survey website 130. Survey website 130 uses Java Server Pages ("JSP") for customer browser access. JSP is not currently written for VXML, it is written for Hypertext Markup Language ("HTML"). The functionality of JSP is selected so that it is available to the VXML browser. For example, java beans and servlet declared arrays do not work with VXML but JSP simple objects: string and integers do. All components of survey system 100 run on a highly secure Amazon Web Services ("AWS") centOS Linux server with secure SQL database 150. Survey system 100 is a fully model view controller ("MVC") compliant servlet for business logic and database calls. Survey System 100 uses secure java class models for database access and back office tasks. In-line survey system 100 utilizes highly secure context parameters for security sensitive data like database location, driver info, and requires access passwords.

Survey website 130 employs an open VXML (version 2.1) compliant browser. Voxeo is the default VXML browser provided by the survey host website. CCXML functionality is also provided by Voxeo, or customer select CCXML browser. An HTTP request to survey host website 110 results in a call to the customer's phone of choice. Survey systems 100 also employ a Controllers device/system 140, as a separate online/cloud based subsystem. Controller 140 are commonly used and well known in the industry. Controller 140 is the web service that keeps track of sessions, privacy, and who is requesting what. Controller 140 keeps track of each user/browser and what functionality is currently available.

FIGS. 3-6 illustrate functionality flow diagrams with simplified representation of the various hardware and software system components, as well as process steps.

Figure 3:
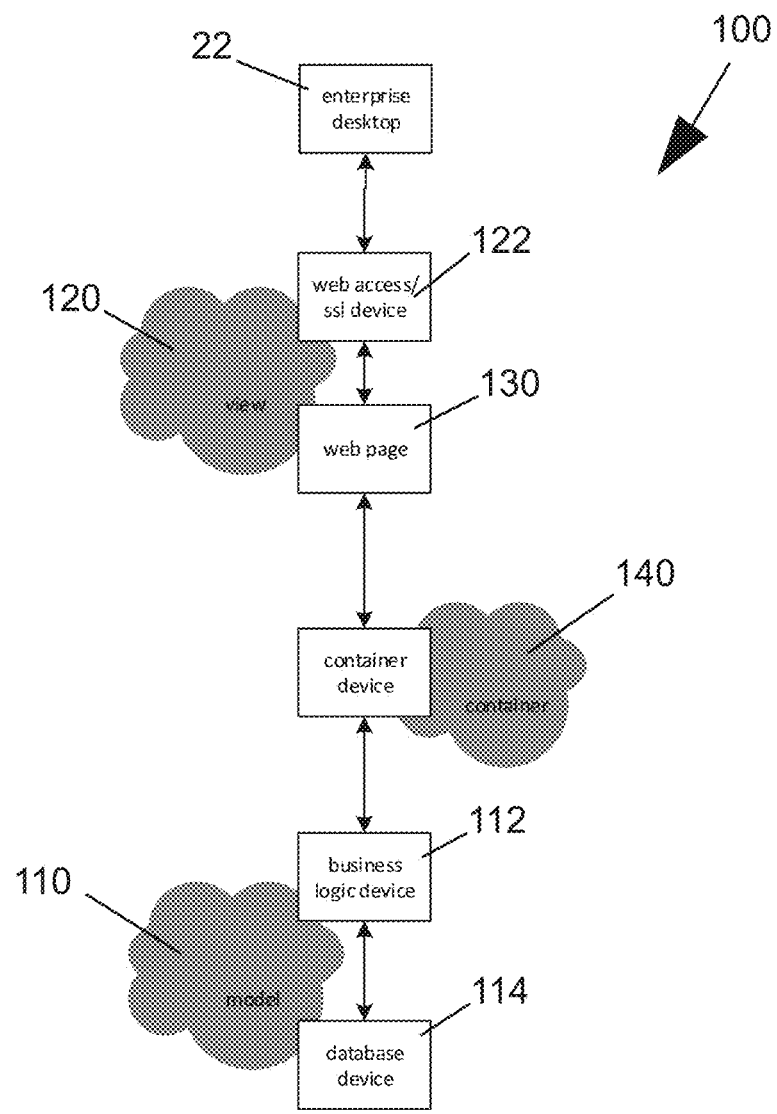
FIG. 3 is a flow chart of an exemplary methodology for an enterprise user to create an account and survey within the survey system of this invention.

FIG. 3 is a flowchart of an exemplary methodology for an enterprise user to create an account and survey within the survey system 100. The enterprise user accesses survey system 100 via website 110 using a desktop browser. Next, the enterprise user creates a user account with login and password through the Controller 140, which is a web service that keeps track of session privacy and who is requesting particular services. Once logged into survey system 100, the enterprise user has access to the system features necessary to create, review, manage and retrieve survey data. Various login forms are available via the user interface. Survey system 100 digests the forms the user fills in via the view and stores his registration and profile into the database. Survey system 100 automatically tracks enterprise users accessing website 110 and the functionality available to them. Survey system 100 also digests the survey participants survey input and stores survey information, including questions, into database 150.

Figure 4:
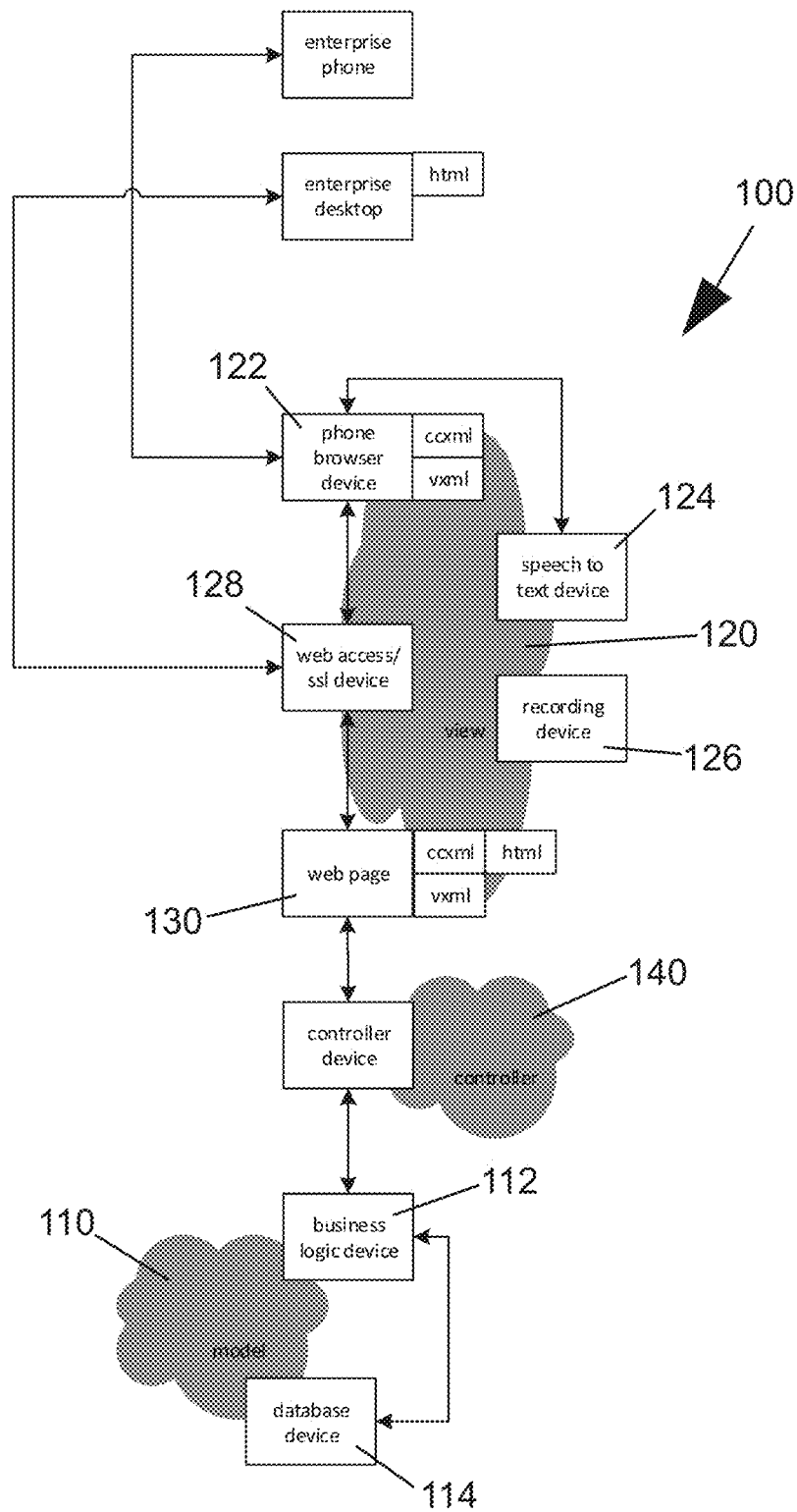
FIG. 4 is a flow chart of an exemplary methodology for an enterprise user to test a newly created survey within the survey system of this invention.

FIG. 4 is a flowchart of an exemplary methodology for an enterprise user to test a newly created survey. Once logged into viewer 120, an enterprise user requests a test of a specific phone survey. The request is via a text form in a video/text browser. Controller 140 knows to serve up only this particular customer's surveys for test, and allows the user to choose a survey. Controller 140 makes requests to survey model 110 to go fetch the survey from database 114. Survey model 110 is programmed to activate phone browser 122 to conduct the test. Phone browser 122 is part of the model view 120. Survey model 110 sends phone browser 122 the survey questions and the user's phone to call for the test via Controller 140. Phone browser 122 activates a text to speech engine 124. A call control extensible markup language (CCXML) module accepts the activation and dials the desired user number. The enterprise user answers the test call and speech device 124 provides a phone browsing experience to the enterprise user. At this time, recording device 126 may be activated as desired to record survey responses. Recordings from the recording device 126 can be stored either as an adjunct to phone browser 122 or stored in entirety in database 114 as a blob, i.e. binary large object. As an adjunct to phone browser 122, only the call pointer information required to match survey content to the adjunct system is stored in database 114. When the enterprise used completes the survey or hangs up, viewer 120 releases control to Controller 140, which activates survey model 110 to store the test answers and recording or pointer into database 114. The enterprise user can then access web pages 130 via viewer 120 to verify that test answers were store in database 114.

Figure 5:
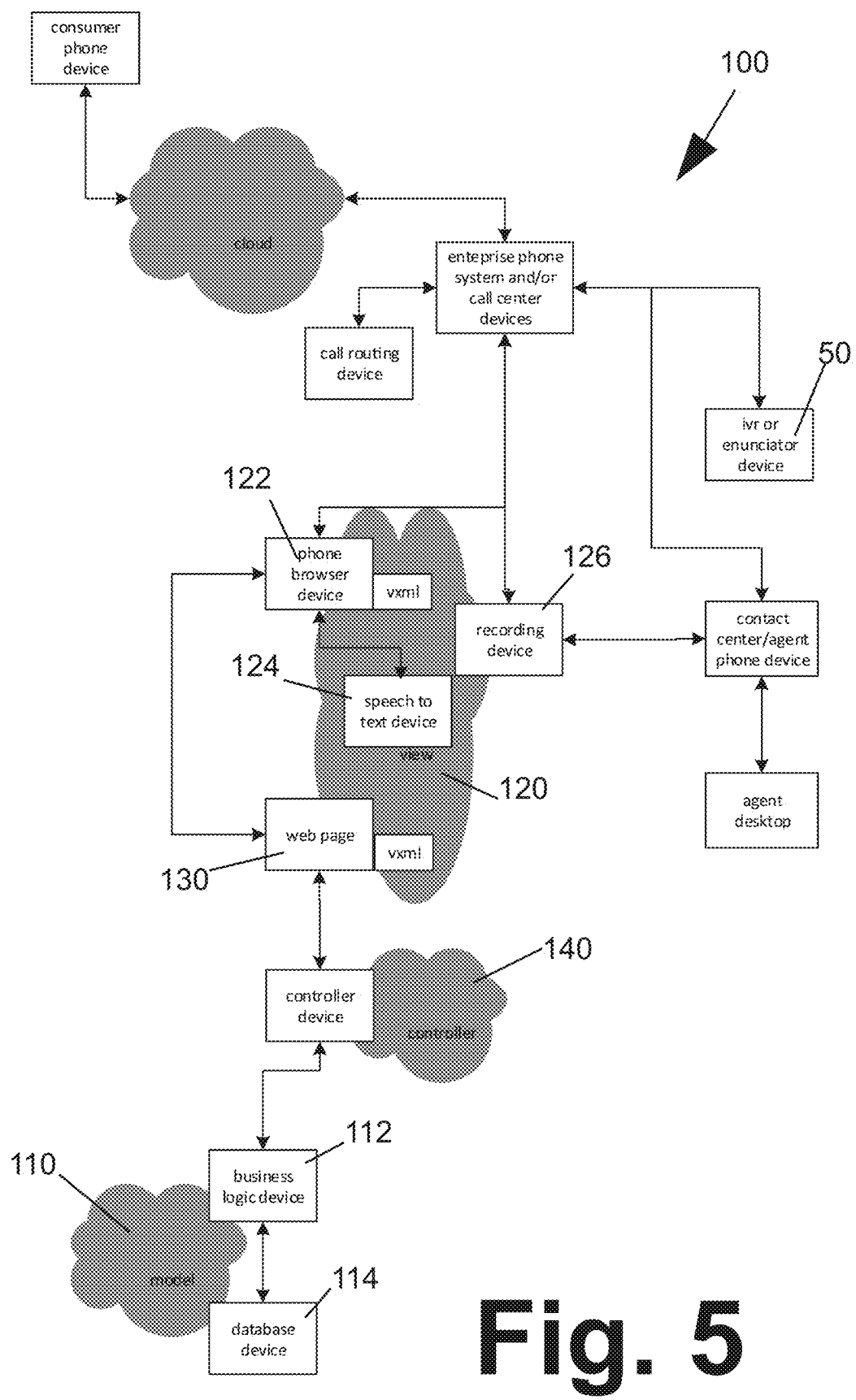
FIG. 5 is a flowchart of an exemplary methodology for a consumer/survey participant ("participant") taking a survey after calling an enterprise contact center.

FIG. 5 is a flowchart of an exemplary methodology for a consumer/survey participant ("participant") to take a survey after calling an enterprise contact center for non-survey purposes, such as calling for customer support, sales, etc. . . . . Once a survey has been created within survey system 100, the participant dials the enterprise contact center and is routed to an enunciator or IVR 50 that offers survey participation at the end of the call. The transition from the customer call to the survey context by the participant is undetectable through survey system 100. The enterprise specific leg of the call is connected and the enterprise agent finishes helping the customer and hangs up. The participant knows to stay on the phone call because the survey model 110 instructs them to do so. Survey systems 100 automatically transfers communication to on-line, web based survey model 110 and initiates the proper survey for the enterprise via the VXML phone browser 122 of viewer 120. The destination phone number from the enterprise to the phone browser identifies the survey to be fetched from survey model 110. Alternatively, an enterprise side enunciator can provide the participant with a pass code that identifies the survey, if the enterprise user does not wish to pay for their own survey phone numbers. Controller 140 activates survey model 110 and database 114 to fetch the questions to be presented via voice to the participant. Controller 140 triggers VXML web page 130 request to phone browser 122. Text to speech engine 124 enunciates the survey questions to the participants. Survey system 100 also allows the participant to browse web pages 130, which contain and present the survey questions. These web pages are web forms being completed via telephony system. Once the survey is complete and customer terminates the call, controller 130 activates survey model 110 and database 114 to store the answer provided to the survey via voice web form. When the entire survey experience is being recorded, recording device 126 can either be part of the view as shown in the diagram, or it can be an adjunct to the phone enterprise contact center system. The entire experience recording is stored in the database 114, as a blob. If an adjunct to the phone system is recording, what is entered into survey database 114 is whatever pointer is required to match up the survey to the recording in the adjunct system. Enterprise users can now access survey system 100 to review survey responses and analytics.

Figure 6:
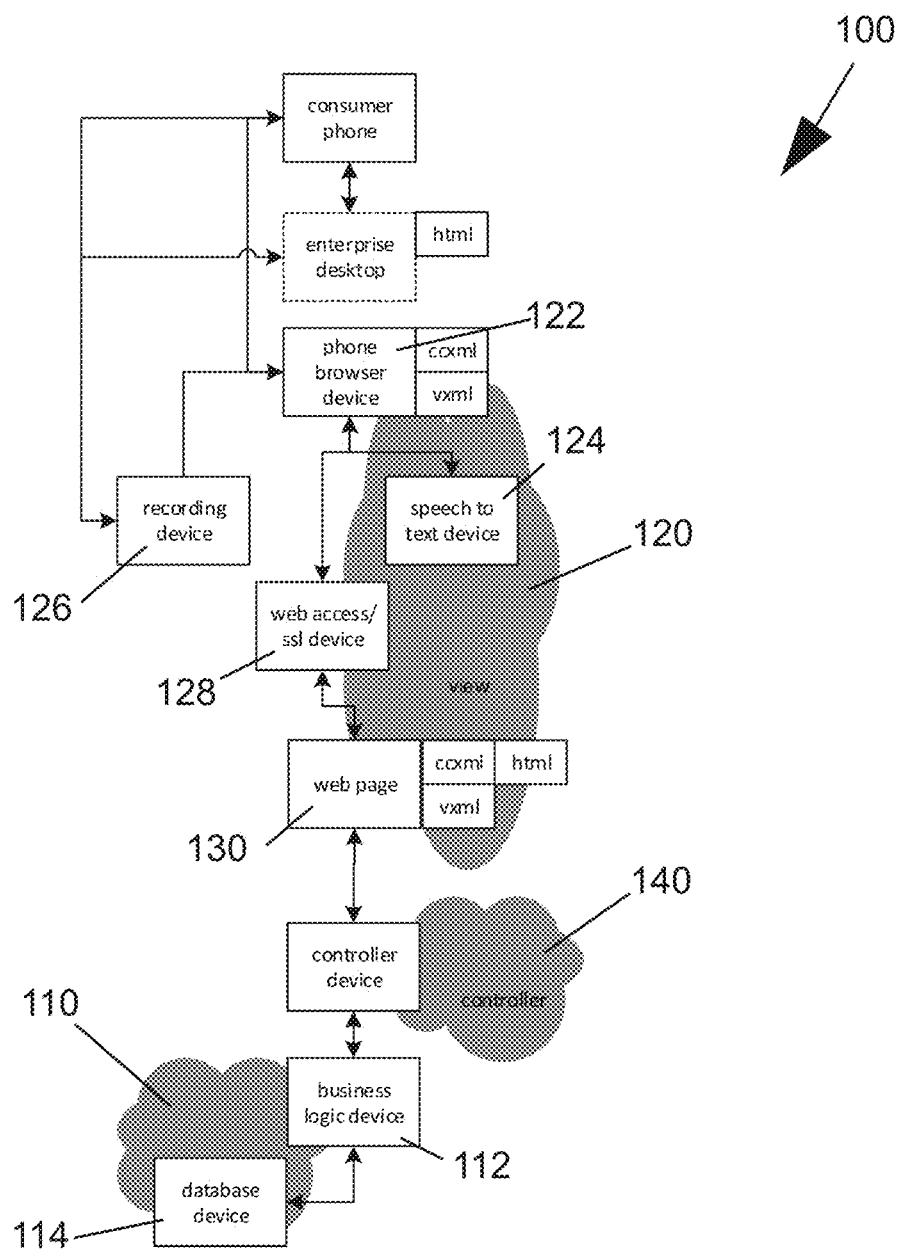
FIG. 6 is a flowchart of an exemplary methodology for a consumer/survey participant taking a survey through direct access to the survey system of this invention.

FIG. 6 is a flowchart of an exemplary methodology for a consumer/survey participant to take a survey through direct access with the viewer 120. Survey model 110 has its own phone number and the consumer is directed by the enterprise to start their survey session by dialing the number of the survey. The participant initiates the survey through web pages 130, which activates survey model 110. View 120 allows participants to select a survey, and enter their desired phone number. Viewer 120 passes the request to controller 130, which fetches the desired survey questions from model 100 and send those questions to phone browser 122. CCXML is deployed to dial the participants desired phone number, then upon connection, text to speech engine 124 enunciates questions into the participant's ear. Once the participant has completed the survey, controller 140 requests the model and database to store data and any recordings in the database.

Survey system 100 employs open source Voice XML phone applications accessible from any VXML Ver. 2.1 browser in the world. The VXML browser can also be accessed from any corporate phone system in the world. If business/user owns a VXML ver 2.1 browser, that browser too, can be pointed at survey host website 110 and offer up surveys. In-line survey System 100 requires no technical setup, programming, or installing.

Survey system 100 is a web based system that allows the survey content to be readily changed and expanded as required without IVR programming or release delays. Survey content can be edited to amend, add or delete survey questions via access to survey host web site 110. Survey content can be edited using conventional editing features, such as copy and paste, select and delete, etc. In-line survey systems allows users to be selectively billed for completed and partially completed surveys. This eliminates capital expenditure and maintenance expenses of on premise in-line survey systems. The survey host web system uses 2048 bit secure socket encryption. In addition, the in-line survey system is Java servlet model view container ("MVC") compliant, meaning that all business logic and data fetching is done via java classes tucked securely behind a servlet container and no passwords or data structures are ever visible via web browser developer tools, as can be the case with simple java script which can be a very unsecure web technology.

Survey system 100 allows selective participant voice responses to be recorded and stored for analysis and verification. All or selected portions of the responses can be recorded and stored for each survey. Recordings can be immediately analyzed for "edginess" and anger, for an email notification to go out to the manager of choice. The in-line survey system should only be offered to callers that are recorded during the service leg of the call. On-premise survey recordings can be matched to the correct survey on the survey host website via caller-IDs and time-stamps. Alternatively, the entire survey call can be recorded at the survey host website.

Survey response thresholds can be set so that any single question or entire survey result below the desired threshold results in an immediate email with callerID of participant to the manager of choice. The in-line survey system can host surveys directly to users via Call Control XML ("CCXML"), which calls to the users phone registered on the survey host website. The participants select the desired webpage and requests the survey and his cell phone rings offering the survey by phone. Surveys content can vary in the number of questions. Survey system 100 "knows" the number of questions to ask and responses to obtain. Survey system 100 provides survey content using conventional survey technique and response patterns, which can be custom tailored to informational needs. Default response patterns can be quickly set and adjusted to accurate and authentic data collection. Response patterns allow for convenient analysis.

While the survey system of this invention is ideally suited for call center, quality assurance, and "customer experience" centric applications, the system can be readily adapted for other applications. For example, phone surveys not related to the service being offered at the time of the call can also be quite successful. For example, a customer calls in to make a credit card payment and is offered a survey about product satisfaction.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A method for administering and collecting survey data, the method comprising:

a) Providing a distributed survey system, the distributed survey system includes
an interactive voice response system,
a cloud-based survey datamodel storing the survey data, and
a survey viewer hosted and facilitated independently from the interactive voice response system and the survey datamodel, the survey viewer allows an enterprise user to access and administer to the functionality of the survey datamodel to create, administrate and store the surveys within the survey datamodel,
b) Providing an enterprise user access to the distributed survey system via the survey viewer to create, administer and store one or more surveys within the survey datamodel, where each of the one or more surveys includes survey questions and survey answers associated with the survey questions;
c) Providing a survey participant access to the distributed survey system via one of the interactive response system and the survey viewer for inputting survey data for a select survey of the one or more surveys into the survey datamodel; and
d) Providing the enterprise user access to the distributed survey system via the survey viewer to test and amend the survey questions and associated survey answers of the selected survey of the one of the plurality of surveys within the survey datamodel independently of the operation and programming of the interactive voice response system.

2. The method of claim 1 wherein step b) further includes allowing the enterprise user to modify one or more surveys within the survey data model without reprogramming the interactive response system.

3. The method of claim 1 wherein in step a) the survey viewer includes a speech-to-text device and a web page, and step d) further includes providing the enterprise user access to the distributed survey system to verbally modify one or more surveys within the survey data model via the speech-to-text device and manually modify one or more surveys within the survey datamodel via the web page.

4. The method of claim 1 wherein in step a) the distributed survey system further includes a controller device operatively connecting the survey viewer and the survey datamodel.

\* \* \* \* \*